C. G. HAYHURST.
FEED BAG HOLDER.
APPLICATION FILED MAR. 14, 1911.
1,017,542.
Patented Feb. 13, 1912.
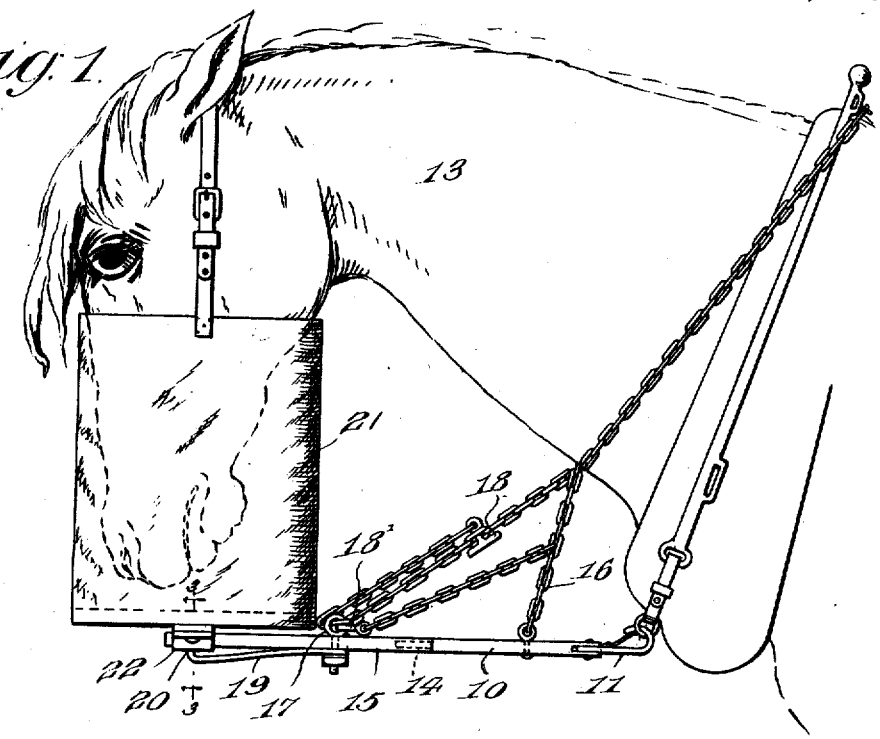
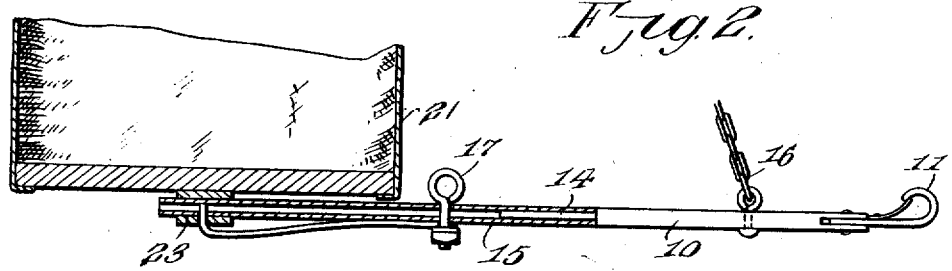
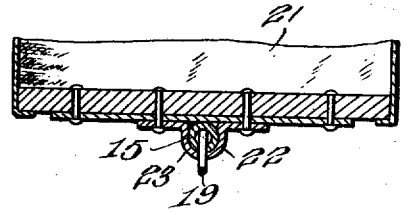
Inventor
Colbert G. Hayhurst,
By Victor J. Evans
Attorney
Witnesses
Frank Hough
F. A. Hoster

UNITED STATES PATENT OFFICE.

COLBERT G. HAYHURST, OF BROOKLYN, NEW YORK, ASSIGNOR OF ONE-THIRD TO GEORGE L. CLARK, OF HUDSON, NEW YORK.

FEED-BAG HOLDER.

1,017,542.      Specification of Letters Patent.      Patented Feb. 13, 1912.

Application filed March 14, 1911. Serial No. 614,313.

*To all whom it may concern:*

Be it known that I, COLBERT G. HAYHURST, a citizen of the United States, residing at Brooklyn, in the county of Kings and State of New York, have invented new and useful Improvements in Feed-Bag Holders, of which the following is a specification.

An object of the invention is to provide a device for properly positioning a feed bag on a horse or other animal so that the animal can conveniently eat therefrom.

For the purpose mentioned use is made of a rod provided with a hook for attaching the said rod to the hame of the harness, a sleeve mounted to turn on said rod, a feed bag for removable attachment to the outer end of the sleeve and a chain secured to the said rod and extending around the horse's neck with the other end of the chain engaging the said sleeve so that the said bag will be at all times held in proper position to permit the horse to conveniently eat therefrom.

Reference is to be had to the accompanying drawings constituting a part of this specification, in which similar characters of reference denote corresponding parts in all the views and in which—

Figure 1 is a side elevation disclosing my device applied to a horse. Fig. 2 is a longitudinal sectional view and Fig. 3 is a transverse section taken on the line 3—3 in Fig. 1.

Referring more particularly to the views, I provide a rod 10 having a snaffle hook 11 at one end thereof, the said snaffle hook being adapted for engagement with the hame 12 mounted on a horse 13 in the usual manner. The other end of the rod 10 is provided with a bearing end 14 adapted to turnably receive the end of the sleeve 15. A chain 16 is secured to the rod 10 and is adapted to extend over the neck of a horse with the other end of the chain for removable attachment to an eye 17 secured to the sleeve 15, the said chain being provided at its outer end with a bar 18 relatively adjusting the length of the chain. As a further means for adjusting the chain, a hook 18 is secured to the chain to an intermediate portion thereof and is adapted to engage the eye 17 so that the chain can easily be held in operative position relative to the said eye. On the under side of the sleeve 15 a spring rod 19 is secured and extends longitudinally of the sleeve to the outer end thereof, the outer end of the said spring having a lateral lug 20 formed thereon, the said lug being adapted to pass through a hole formed in the said sleeve. A feed bag 21 is provided having a loop 22 formed on the under side thereof, said loop being provided with a hole 23 and the said feed bag being adapted to be mounted on the sleeve 15 by sliding the loop over the end of the said sleeve and disposing the lug 20 and the spring 19 through the hole in the said loop and the hole in the said sleeve, thus releasably holding the feed bag on the said sleeve.

From the foregoing description it will be readily seen that the feed bag is so positioned relatively to the horse that any feed in the bag will not be thrown outwardly therefrom when the horse moves his head upwardly in view of the fact that any upward movement of the horse's head would be communicated to the feed bag by the chain connection, thus also moving the feed bag upwardly and as a relative movement is established between the feed bag and the horse's head, it is impossible for a horse to throw any of the feed out of the bag.

My device can be quickly attached and detached on a horse and the various parts can be disengaged so that the whole can be attached to a vehicle when it is not desired to use the feed bag, the whole being foldable to form a compact package.

Having thus fully described the invention, what I claim as new, is:—

1. In a feed bag holder the combination of a rod, a hook mounted on the said rod and adapted to engage a harness, a sleeve mounted to turn on one end of the said rod, a feed bag mounted on the outer end of the said sleeve, a spring clasp secured to the said sleeve and engaging the said feed bag to removably position the same on the said sleeve, a chain secured to the said rod and extending over the horse's neck with the other end of the chain removably attached to the said sleeve and means for adjusting the length of the chain relatively to the said sleeve.

2. A feed bag holder comprising a rod for removable attachment to the hame of a harness, a sleeve mounted to turn at one end of the said rod, a feed bag releasably mounted at the outer end of the said sleeve and a chain connected to the said rod and extending over the horse's neck with the other end of the said chain releasably engaging the said sleeve to position the said bag relatively to the horse's head.

3. A feed bag holder comprising a rod, a snaffle hook mounted on the said rod and adapted to engage a harness, a sleeve mounted to turn on the said rod, a chain secured to the said rod and adapted to pass over the horse's neck with the other end of the chain releasably connected to the said sleeve, a hook on the said chain for securing the said chain to the said sleeve and retaining the same in relative locking engagement, a spring clasp formed on the under side of the said sleeve, a feed bag, and a loop formed on the under side of the said feed bag, the said feed bag being adapted to be attached to an end of the said sleeve with the said loop encircling the said sleeve and the said spring being adapted for releasable engagement with the said loop, to relatively position the said feed bag on the said sleeve.

4. In a feed bag holder the combination of a rod for connection with the hame of a harness, a sleeve mounted at one end of the said rod, a feed bag mounted at one end of the said sleeve and a chain connected to the said rod and extending from the horse's neck with the other end of the said chain releasably connected to the said sleeve.

5. In a feed bag holder the combination of a rod, a hook mounted on the rod and adapted for engagement with the harness, a sleeve mounted at one end of the said rod, a feed bag mounted on the said sleeve and a chain secured to the said rod and extending over the horse's neck with the other end of the said chain connected to the said sleeve.

In testimony whereof I affix my signature in presence of two witnesses.

COLBERT G. HAYHURST.

Witnesses:
Thomas H. Kyle,
Warren Davis Card.

Copies of this patent may be obtained for five cents each, by addressing the "Commissioner of Patents, Washington, D. C."